United States Patent
Frost et al.

(10) Patent No.: US 10,351,175 B2
(45) Date of Patent: Jul. 16, 2019

(54) MOTOR VEHICLE HYBRID STRUCTURAL PART

(71) Applicant: Benteler Automobiltechnik GmbH, Paderborn (DE)

(72) Inventors: Georg Frost, Steinheim (DE); Jochem Grewe, Salzkotten (DE); Gero Muellers, Paderborn (DE); Christian Handing, Langenberg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/283,962

(22) Filed: Oct. 3, 2016

(65) Prior Publication Data

US 2017/0096171 A1    Apr. 6, 2017

(30) Foreign Application Priority Data

Oct. 5, 2015 (DE) .................. 10 2015 116 851

(51) Int. Cl.
*B62D 21/15* (2006.01)
*B62D 25/04* (2006.01)
(Continued)

(52) U.S. Cl.
CPC ............ *B62D 21/155* (2013.01); *B60R 19/18* (2013.01); *B62D 21/02* (2013.01); *B62D 25/04* (2013.01); *B62D 25/2036* (2013.01); *B62D 27/026* (2013.01); *B62D 29/008* (2013.01); *B60R 2019/182* (2013.01)

(58) Field of Classification Search
CPC .. B62D 21/155; B62D 25/2036; B62D 21/02; B62D 29/008; B62D 27/026; B62D 25/04; B60R 19/18; B60R 2019/182
USPC .... 296/193.01–193.06, 187.12, 203.01, 205; 428/544, 588, 589, 590
See application file for complete search history.

(56) References Cited

U.S. PATENT DOCUMENTS

| 5,277,469 A * | 1/1994 | Klippel ................. B60J 5/0444 296/146.6 |
| 6,102,472 A * | 8/2000 | Wallstrom ............. B62D 25/00 296/203.01 |

(Continued)

FOREIGN PATENT DOCUMENTS

| CN | 203318522 U | 12/2013 |
| DE | 102004005568 A1 | 9/2005 |

(Continued)

OTHER PUBLICATIONS

Chinese Office Action for Application No. 201610870964.0 dated Apr. 26, 2018; 29 pp.

(Continued)

*Primary Examiner* — Brent W Herring
(74) *Attorney, Agent, or Firm* — Hauptman Ham, LLP (57) ABSTRACT

Motor vehicle hybrid structural part, comprising a main structural part 2 and at least one reinforcement patch the main structural part 2 being embodied as a sheet-metal structural part made of a steel alloy or light metal alloy and the reinforcement patch being made of light metal, which is characterized in that the reinforcement patch is an extruded structural part with at least two wall thicknesses differing from one another in cross section.

13 Claims, 5 Drawing Sheets

(51) Int. Cl.
  *B62D 21/02* (2006.01)
  *B62D 29/00* (2006.01)
  *B62D 27/02* (2006.01)
  *B62D 25/20* (2006.01)
  *B60R 19/18* (2006.01)

(56) References Cited

U.S. PATENT DOCUMENTS

| | | | |
|---|---|---|---|
| 6,702,368 B1* | 3/2004 | Hanyu | B62D 25/04 296/193.05 |
| 6,820,451 B2* | 11/2004 | Renzzulla | B21D 5/08 72/173 |
| 7,762,622 B2* | 7/2010 | Lakic | B62D 25/04 296/193.06 |
| 9,090,287 B2* | 7/2015 | Ezzat | B62D 25/00 |
| 9,090,293 B1 | 7/2015 | Courtright et al. | |
| 9,221,498 B2* | 12/2015 | Lakic | B62D 25/04 |
| 9,260,137 B2* | 2/2016 | Honda | B62D 25/04 |
| 9,487,244 B2* | 11/2016 | Elfwing | B23K 11/11 |
| 2003/0038489 A1* | 2/2003 | Renzzulla | B21D 5/08 293/102 |
| 2005/0062299 A1* | 3/2005 | Renzzulla | B21D 5/08 293/102 |
| 2005/0189790 A1* | 9/2005 | Chernoff | B62D 25/02 296/193.05 |
| 2006/0033347 A1* | 2/2006 | Hauger | B62D 21/15 293/133 |
| 2008/0106123 A1* | 5/2008 | Lakic | B62D 25/04 296/205 |
| 2010/0231004 A1* | 9/2010 | Lakic | B62D 25/04 296/193.06 |
| 2011/0095567 A1* | 4/2011 | Ishigame | B62D 21/157 296/187.03 |
| 2011/0210581 A1* | 9/2011 | Kunishi | B62D 21/157 296/193.01 |
| 2014/0197664 A1* | 7/2014 | Ezzat | B62D 25/00 296/203.01 |
| 2015/0091327 A1* | 4/2015 | Kim | B21B 1/12 296/187.03 |
| 2015/0115654 A1* | 4/2015 | Honda | B62D 29/002 296/187.12 |
| 2016/0046330 A1* | 2/2016 | Elfwing | B23K 11/11 296/193.01 |
| 2016/0082542 A1* | 3/2016 | Hiramatsu | B23K 35/0205 403/270 |

FOREIGN PATENT DOCUMENTS

| | | |
|---|---|---|
| DE | 102004037206 A1 | 3/2006 |
| DE | 102012020432 B3 | 2/2014 |

OTHER PUBLICATIONS

Office Action for Chinese Application No. 201610870964.0 dated Feb. 15, 2019; 18pp.

\* cited by examiner

MOTOR VEHICLE HYBRID STRUCTURAL PART

RELATED APPLICATIONS

The present application claims priority from German Application No. 10 2015 116 851.0, filed Oct. 5, 2015, the disclosure of which is hereby incorporated by reference herein in its entirety.

The present invention relates to a motor vehicle hybrid structural part according to the features in the preamble of patent Claim 1.

In motor vehicle construction, it is known from the prior art to provide self-supporting bodies. These are produced from steel or else also from light metal, in particular from aluminum. For this purpose, individual motor vehicle structural parts such as sills, motor vehicle pillars, roof spars, crossmembers or longitudinal members are produced individually as sheet-metal structural parts in various shaping production steps and then coupled to form the self-supporting motor vehicle body.

In this respect, the motor vehicle body has two essential tasks. Firstly, the motor vehicle body should be torsion-resistant, in order to serve as a basis for receiving the various components of the motor vehicle consisting of engine, chassis and also cover structural parts such as doors, bonnet. A second essential aspect which is demanded of a motor vehicle body is crash safety, in particular with a view to the passenger compartment.

In this respect, in the case of a collision a number of parts of the motor vehicle body should deform in a targeted manner in order to absorb crash energy, and other parts should purposely have a high rigidity, in order to ensure dimensional stability of the passenger compartment and therefore protection for the occupants.

These two requirements conflict with favorable producibility and cost-effective production of the aforementioned motor vehicle structural parts and a low dead weight, such that a high level of driving dynamics of the motor vehicle is achieved combined with low fuel consumption and $CO_2$ emission. For this purpose, various techniques for producing structural parts with an optimized weight and with high strength properties are known from the prior art. By way of example, hot-forming and press-hardening technology is known for producing steel structural parts.

Particularly for the production of light metal structural parts, it is known to extrude blanks and subsequently to process them by cutting and/or forming, such that correspondingly differing cross-sectional geometries can be produced so as to satisfy the requirements. On account of the extrusion technology, a limit which lies in the production process is set here in turn, however, with regard to the costs incurred during the production by only one possible extrusion direction. The structural part can therefore be optimized in terms of weight and strength in cross section. Particularly in the case of structural parts extending in the longitudinal direction, however, there would always be a compromise in terms of the rigidity of the structural part over the longitudinal direction.

U.S. Pat. No. 9,090,293 B1 discloses, for example, a motor vehicle structural part which is reinforced with a reinforcement structural part. The reinforcement structural part is produced by extrusion. Furthermore, DE 10 2012 020 432 B3 discloses a motor vehicle sill, in which an inner sill made of steel and an outer sill made of extruded light metal are arranged on the motor vehicle in a manner running oriented in the same direction.

It is therefore an object of the present invention to provide a structural part which is produced at low cost and with little production outlay and at the same time has high strength properties and an optimized weight.

The aforementioned object is achieved by a motor vehicle hybrid structural part having the features in patent Claim 1.

Advantageous embodiment variants of the present invention are the subject matter of the dependent patent claims. The motor vehicle hybrid structural part comprises a main structural part and at least one reinforcement patch, the main structural part being embodied as a sheet-metal structural part made of a steel alloy or light metal alloy and the reinforcement patch being made of light metal. The reinforcement patch is an extruded structural part with a differing wall thickness in cross section. According to the invention, the motor vehicle hybrid structural part is distinguished by the fact that the direction of extrusion of the reinforcement patch is oriented at an angle of 70° to 110° with respect to the longitudinal direction of the main structural part.

By virtue of the motor vehicle hybrid structural part according to the invention, it is therefore possible to produce a structural part, which in particular is a motor vehicle pillar, a roof spar or a crossmember, hence a structural part extending in the longitudinal direction thereof, with an optimized cross section. It is also possible for tunnels, for example gearbox tunnels, sills, battery carriers in particular with a thermoformed tub, and longitudinal members and also crossmembers to be produced with at least one reinforcement patch. This in particular effects a weight optimization. The disadvantage which possibly arises as a result with respect to a good strength in the longitudinal section of the structural part is taken into account according to the invention by virtue of the fact that a reinforcement patch is applied. However, this reinforcement patch itself has a differing wall thickness in its cross section, the cross section of the reinforcement patch preferably being oriented in the direction of longitudinal section of the main structural part. As a result of this, too, it is possible in turn to design the motor vehicle hybrid structural part in an optimum manner optimized in terms of loading and optimized in terms of weight with the at least one reinforcement patch. In the regions which are subject to a low level of loading in the longitudinal direction of the main structural part, an optimally small wall thickness can therefore be set by the main structural part itself, and no reinforcement patch or else only part of the reinforcement patch can be arranged with a small wall thickness in said regions. By contrast, the reinforcement patch and in particular the cross-sectional region of the reinforcement patch is arranged with a greater wall thickness in regions which are subject to a higher level of loading with respect to the longitudinal direction, or else regions which are intended to have a high crash rigidity.

By virtue of the fact that the reinforcement patch is formed from a light metal alloy, in particular from an aluminum alloy, preferably from a 6000-series or 7000-series aluminum alloy, it is possible in particular to produce said reinforcement patch itself as an extruded profile. It is therefore possible to produce a reinforcement patch easily and cost-effectively with a differing wall thickness. By virtue of the fact that the reinforcement patch extends only over a partial portion in the longitudinal direction of the main structural part, said reinforcement patch can be produced as a flat-extruded structural part with wall thicknesses differing from one another. If the reinforcement metal sheet nevertheless extends over a length portion of the longitudinal direction of the main structural part of more than 10 cm, in particular more than 20 cm, the reinforcement patch may also deviate from a flat or straight extrusion initially in cross section, i.e. it can be extruded for example with a C shape, with a wave shape or with an omega shape, likewise with wall thicknesses differing from one another, and subsequently flattened or rolled out and/or widened. The thus produced cross section of the extruded structural part is then always oriented in the longitudinal direction of the main structural part, however. Within the context of the invention, this means that the direction of extrusion of the reinforcement patch runs oriented at an angle with respect to the longitudinal direction of the main structural part. This angle is 70° to 110°, in particular 85° to 95° and very particularly preferably 90°.

The main structural part itself furthermore preferably has a varying cross section in its longitudinal direction. In this respect, the main structural part can have a homogeneous wall thickness in cross section over its entire longitudinal direction. As an alternative or in addition, however, the main structural part can have a differing wall thickness at least in portions in cross section in its longitudinal direction. The main structural part preferably has a wall thickness, as an aluminum structural part, of 2.5 to 6 mm. If the main structural part is formed from steel sheet, it preferably has a wall thickness of 1.5 to 4 mm.

It is furthermore particularly preferable that the reinforcement patch has a higher strength and/or greater wall thickness than the main structural part, in particular the cross-sectional region of the main structural part in which the reinforcement patch rests against the main structural part at least in regions, in particular over its entire surface area.

It is furthermore particularly preferable that the reinforcement patch has a yield strength RP0.2 of greater than 250 MPa, preferably greater than 300 MPa and preferably smaller than 550 MPa. It is furthermore particularly preferable that the reinforcement patch has a higher strength and/or wall thickness than the main structural part. It is furthermore particularly preferable that the main structural part is embodied as a steel structural part, in particular as a hot-formed and press-hardened steel structural part. This then has high-strength or ultra-high-strength properties and has a tensile strength of greater than 1100 MPa, in particular greater than 1350 MPa.

It is particularly preferable that a ratio between the overall length of the main structural part in the longitudinal direction thereof and the overall length of a reinforcement patch, likewise in the longitudinal direction of the main structural part, lies in a ratio of between 1.25:3, preferably 1.4:2. In the latter case, for example, this means that the main structural part is twice as long as the reinforcement patch. Particularly in the region of the wall thickness which is relatively thick in cross section, the reinforcement patch has a wall thickness of between 4 and 6 mm. The thinner wall thickness region, which is adjacent thereto in cross section, preferably has a wall thickness of between 2 and 4 mm. Intermediate thicknesses in transition regions or regions of average wall thickness with respect to the aforementioned values are possible.

The reinforcement patch and the main structural part are furthermore coupled to one another. The coupling can be achieved by adhesive bonding and/or thermal joining and/or with a form fit, preferably by joining. Within the context of the invention, it is possible to configure the coupling as MIG welding, clinching or a riveting method, particularly when using a main structural part and a reinforcement patch made of a light metal alloy.

Within the context of the invention, "hybrid structural part" means not only that the structural part is formed from two differing materials, but also that the structural part is formed from the same or extremely similar materials, but from two structural parts, i.e. main structural part and reinforcement patch.

The reinforcement patch and the main structural part can firstly be coupled to one another as semifinished products and subsequently deformed together. Within the context of the invention, it is also possible, however, for the main structural part to firstly be deformed and subsequently for the reinforcement patch to be coupled. In this case, the reinforcement patch does not need to be shaped, but instead use is made of a reinforcement patch which is merely cut to length after the extrusion. It is also conceivable, however, for the main structural part to be shaped and for the reinforcement patch to be shaped separately therefrom, and subsequently for both pre-shaped structural parts to be coupled to one another.

Furthermore, it is conceivable for the main structural part to have a closing plate, such that the main structural part, with the incorporation of the reinforcement patch, and together with the closing plate, is formed as a hollow profile in portions at least in the longitudinal direction thereof.

It is also conceivable for the reinforcement patch and the main structural part to form a hollow profile at least in portions in the longitudinal direction of the main structural part. The reinforcement patch therefore rests areally only in certain regions in the cross section of the main structural part.

It is preferably also possible, however, for the main structural part and the reinforcement patch to be in contact over their entire surface area. A change in wall thickness on the reinforcement patch is then formed in particular on that side of the reinforcement patch which is remote from the main structural part.

Further advantages, features, properties and aspects of the present invention are illustrated in the schematic figures which follow. These serve for a clear understanding of the invention.

In the figures, the same reference signs are used for the same or similar structural parts, even if a repeated description is avoided for reasons of simplification.

FIG. 1 shows a motor vehicle hybrid structural part in the form of a motor vehicle pillar 1, comprising a main structural part 2, which represents the actual motor vehicle pillar 1, and two reinforcement patches 3, 4 arranged therein. The motor vehicle pillar 1 itself is a sheet-metal structural part with wall thicknesses W5, W6, W7, W9 differing from one another in cross section. This is illustrated in the cross-sectional views shown in FIGS. 1b to 1d. The motor vehicle pillar 1 here is in the form of a profile of hat-like form in cross section and has a web 5, legs 6 extending from the web 5 and flanges 7 in turn protruding from the legs 6. Furthermore, the cross section changes in the longitudinal direction 8 of the motor vehicle pillar 1.

Figure 1A:
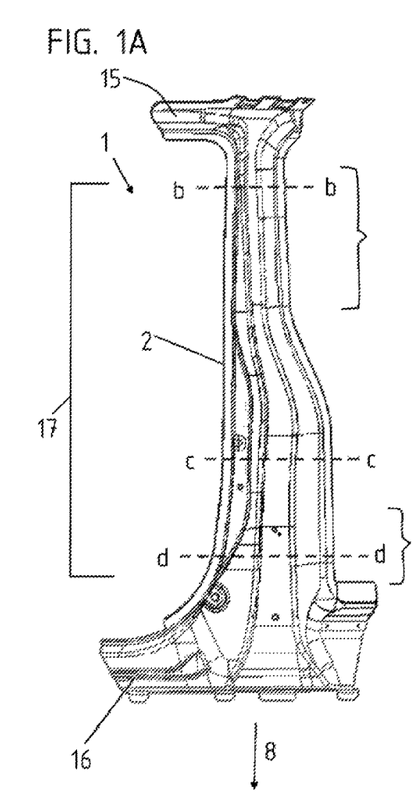
FIGS. 1a to 1d show a motor vehicle pillar in plan view and various cross-sectional views.
Figure 1B:
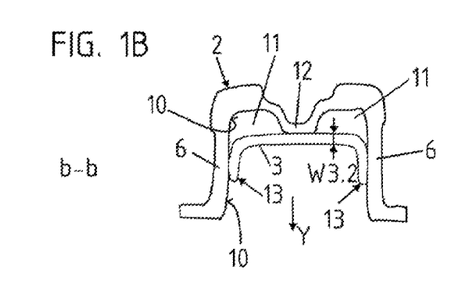
Figure 1C:
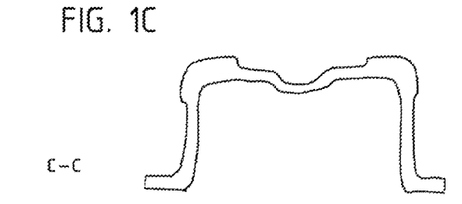
Figure 1D:
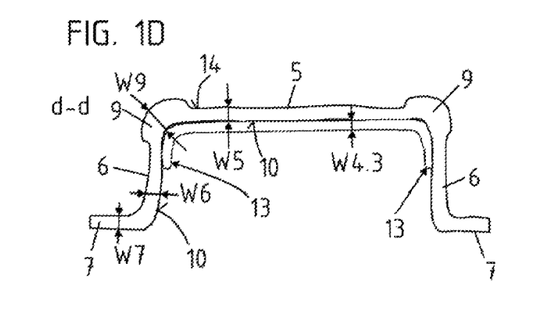
Figures 2A, 2B, 2C, 2D:
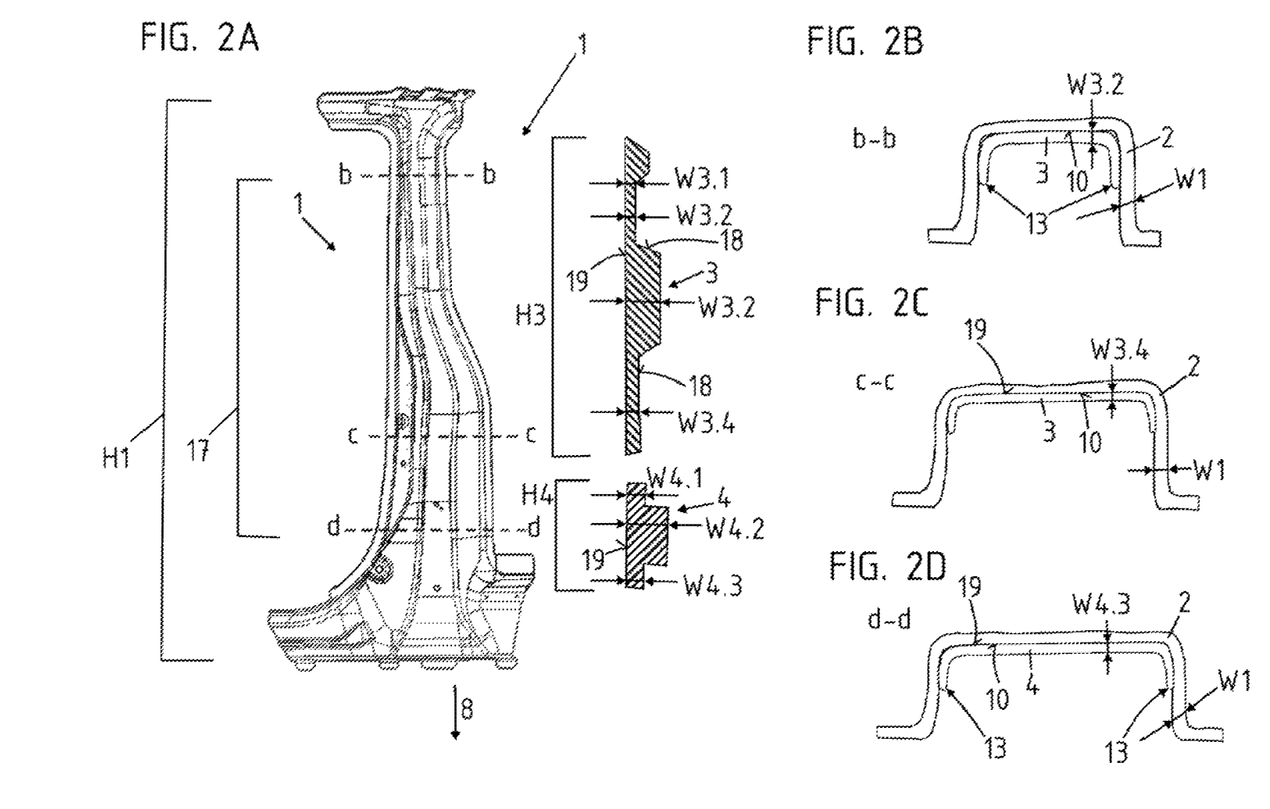
FIGS. 2a to 2d show a motor vehicle pillar having a main structural part and a uniform wall thickness.

Here, a greater wall thickness W9 is formed in a radii region 9 compared to a wall thickness W5 of the web 5 and a wall thickness W6 of the legs 6 and also a wall thickness W7 of the flanges 7. The wall thicknesses W5, W6, W7 may in turn differ from one another. In particular, the wall thickness W7 and/or W5 is smaller than the wall thickness W6. However, the wall thicknesses W5, W6 and W7 are all smaller than the wall thickness W9. The wall thickness W5, W6, W7, W9 of leg 6, web 5, flange 7 and radii region 9 is preferably of identical form in the longitudinal direction 8 of the main structural part 2. Exceptions therefrom are thinned regions or other material reductions which arise, for example, during press forming. The cross-sectional configuration itself changes, however. Therefore, by way of example, the motor vehicle pillar 1 itself can be produced from an extruded profile processed by press forming. This realizes an optimization in terms of weight and loading of the motor vehicle pillar 1 in cross section. However, an optimization in terms of weight can be embodied in such a manner that the reinforcement patches 3, 4 are arranged extending over the longitudinal direction 8 in critical regions, these reinforcement patches providing an increased structural part strength and/or crash safety over the longitudinal extent. To this end, the upper reinforcement patch 3 with respect to the installed position in the motor vehicle vertical direction Z has differing wall thicknesses W3.1 to W3.3 in cross section. The cross section of the reinforcement patch 3 in this respect corresponds to a section in the longitudinal direction 8 of the hybrid structural part. The wall thickness W3.2 is smaller than the wall thickness W3.1. The wall thickness W3.1 is in turn smaller than the wall thickness W3.3. At an upper side, the upper reinforcement patch 3 is formed in a manner tapering at an angle α. The cross section of the reinforcement patch 3 is therefore oriented in the longitudinal direction 8 of the motor vehicle pillar 1. The reinforcement patch 3 has wall thicknesses which differ from one another and are matched to the required strength and/or crash safety. It can furthermore be seen, according to the intersection b-b in FIG. 1b, that the reinforcement patch 3 is arranged on an inner side 10 of the motor vehicle pillar 1, in such a manner that two cavities 11 are formed at least in portions in the longitudinal direction 8. A central region 12 of the web 5 therefore rests on the reinforcement patch 3. The ends 13 of the reinforcement patch 3 are bent with respect to the motor vehicle transverse direction Y and rest against the inner side of the legs 6 of the B pillar.

This situation is different in the lower reinforcement patch 4 as shown in FIG. 1d. This, too, has wall thicknesses W4.1 to W4.3 which differ from one another in its cross section. However, the lower reinforcement patch 4 rests against the inner side 10 of the motor vehicle pillar 1 over its entire surface area. The wall thickness transition of the motor vehicle pillar 1 is formed in particular at the radii regions 9 on an outer side 14. The wall thickness transition of the reinforcement patch 4 is formed on that side which is located opposite the motor vehicle pillar 1. Furthermore, the motor vehicle pillar 1 has a roof connection region 15 and a sill connection region 16, which have a widened form in cross section compared to the pillar region lying therebetween.

FIGS. 2a to d show an alternative embodiment variant of a motor vehicle pillar 1. The upper and the lower reinforcement patch 3, 4 here have a differing vertical extent. A second difference with respect to the embodiment variant shown in FIG. 1 is that the motor vehicle pillar 1 has a cross section which changes in its longitudinal direction 8 and has a homogeneous wall thickness W1. The respective reinforcement patch 3, 4 in turn has differing wall thicknesses in its cross-sectional view. The cross section of the respective reinforcement patch 3, 4 extends in the longitudinal direction 8 of the motor vehicle pillar. The reinforcement patches 3, 4 have a differing wall thickness over a cross-sectional profile, the step in wall thickness being formed on an outer side 18 and an inner side 19 of the respective reinforcement patch 3, 4 having a substantially smooth form, such that said inner side in each case rests substantially over its entire surface area against the inner side 10 of the main structural part 2. On the outside, the ends 13 of the reinforcement patch 3, 4 are again bent. Within the context of the invention, a smooth surface of the reinforcement patch 3, 4 means that the latter can subsequently rest against a surface. In this respect, a three-dimensional configuration of the surface is not ruled out and therefore a smooth surface is not exclusively to be understood as meaning a planar surface. It is also the case that the lower reinforcement patch 4 with respect to the motor vehicle vertical direction Z has differing wall thicknesses W4.1 to W4.3 in its cross section. The upper reinforcement patch 3 extends here with a height H3 over the pillar region 17 of the motor vehicle pillar 1. This preferably corresponds to 40% to 60% of the overall height H1 of the motor vehicle pillar 1. By contrast, the lower reinforcement patch 4 has a height H4. The lower reinforcement patch 4 is arranged in the bottom third of the motor vehicle pillar 1. The height H4 corresponds in particular to 5% to 30%, preferably 10% to 20%, of the overall height H1 of the motor vehicle pillar 1. Alternatively, it can also be provided to combine the patches 3 and 4, such that a reinforcement patch of this type can also extend over the pillar portion and has a height of between 50% and 75% of the overall height H1.

Figure 3A:
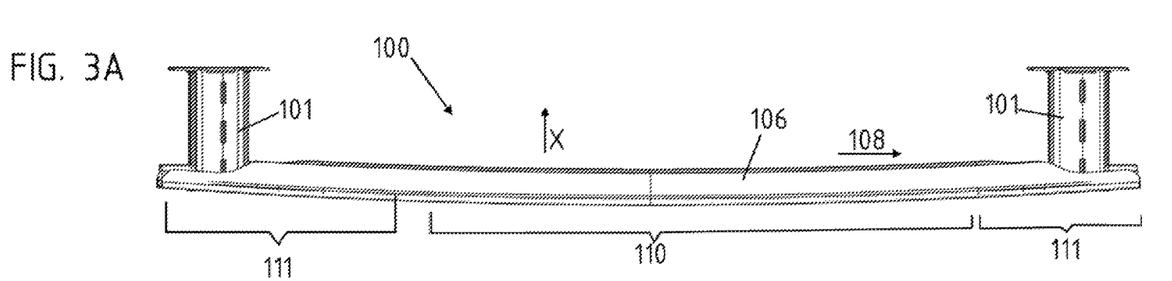
FIGS. 3a to 3e show a crossmember according to the invention in plan view, front view and cross-sectional views of possible reinforcement patches.

FIGS. 3a and b show a crossmember 100 according to the invention in plan view and front view. The crossmember 100 has crash boxes 101 at its ends, and coupled thereto, and extends in the motor vehicle transverse direction Y. By way of example, the crossmember 100 has ribbing 102, which extends in the longitudinal direction 108 and serves for additional bracing against sagging in the motor vehicle longitudinal direction X. FIGS. 3c to e show possible regions with respect to FIG. 3b which in particular are arranged internally on the reinforcement patch 103. The reinforcement patches 103 here are shown in a respective cross section and have wall thicknesses W103 which differ from one another, it being possible for one or more reinforcement patches 103 to be arranged on the crossmember 106.

The reinforcement patch 103 shown in FIG. 3c has differing wall thicknesses W103.1 to W103.3. The differing wall thicknesses W103.1 to W103.3 each have a wall thickness step 104, which is formed on an outer side 105. Consequently, an inner side 106 has a smooth form and comes to rest on an inner side 107 (not shown in more detail) of the crossmember 100. In this case, the cross section of a respective reinforcement patch 103 as shown in FIGS. 3c to e varies in each case in the longitudinal direction 108 of the crossmember 100.

As shown in FIG. 3d, the cross section initially increases in wall thickness W103 from left to right, with respect to the image plane, and thereby decreases again. This reinforcement patch 103 is arranged in particular in the central region 110 of the crossmember 106.

In the case of the reinforcement patch 103 shown in FIG. 3e, the wall thickness of the cross section decreases linearly over the course of the cross section. As an alternative to the embodiment shown in FIG. 3c, this reinforcement patch 103 is located in the end region 111.

Figure 3B:
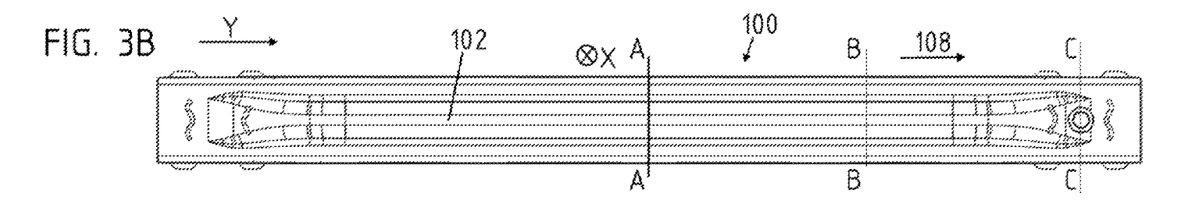
Figure 3C:
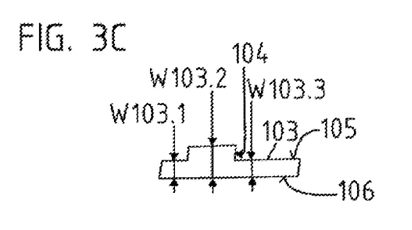
Figure 3D:
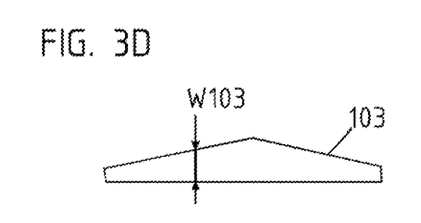
Figure 3E:
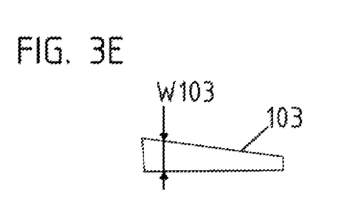
Figure 4A:
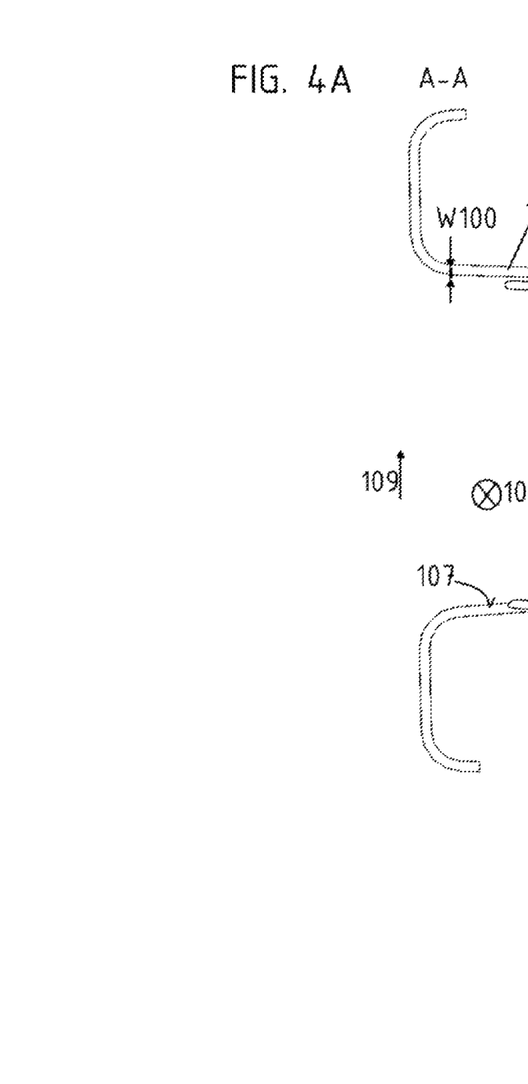
FIGS. 4a to 4c show cross-sectional views of the crossmember shown in FIG. 3b, FIGS. 5a to 5d show a roof spar according to the invention in side view, perspective view and cross-sectional views.
Figures 4B, 4C:
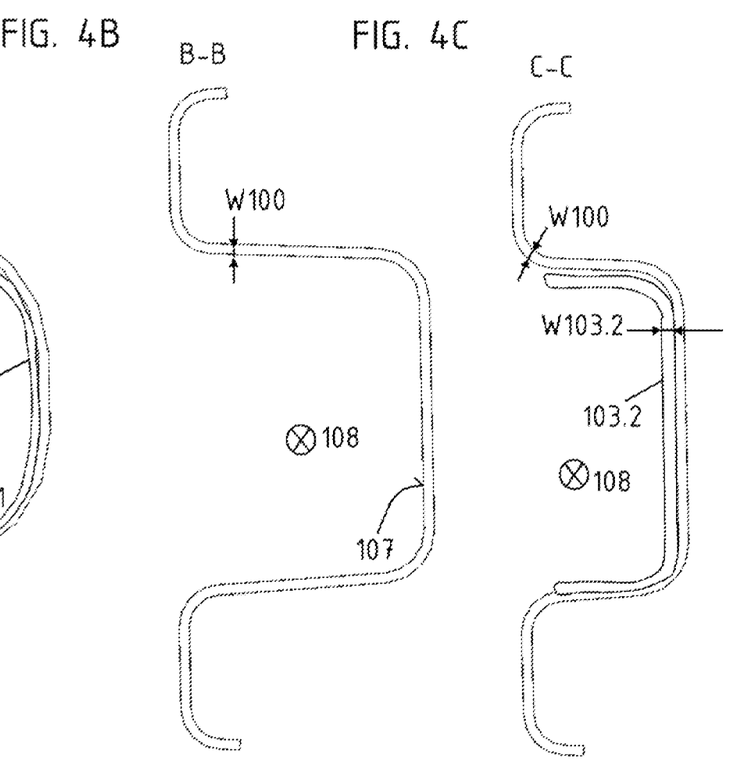

FIGS. 4a to c show various sectional views according to the intersections A-A, B-B and C-C shown in FIG. 3b. It can readily be seen that the crossmember 100 is formed as a hat-like cross-sectional profile with a cross-sectional configuration which varies in the longitudinal direction 108 but with a uniform wall thickness W100. A reinforcement patch 103.1 is arranged in a central region of the crossmember 100, and a reinforcement patch 103.2 is arranged at a distance therefrom in an end region according to the intersection C-C. As is shown here, the reinforcement patches 103.1, 103.2 have a respectively homogeneous wall thickness W103.1, W103.2 in their longitudinal section, but a differing wall thickness in cross section as shown in FIGS. 3c to e. The reinforcement patches 103.1, 103.2 each rest over their entire surface area against the inner side 107 of the crossmember 100. For this purpose, the reinforcement patches 103.1, 103.2 have a three-dimensional shape in their longitudinal direction 109, which corresponds to the transverse direction of the crossmember 100, and therefore they rest against the inner side 107 or inner lateral surface of the cross section of the crossmember 100.

Figures 5A, 5B, 5C, 5D:
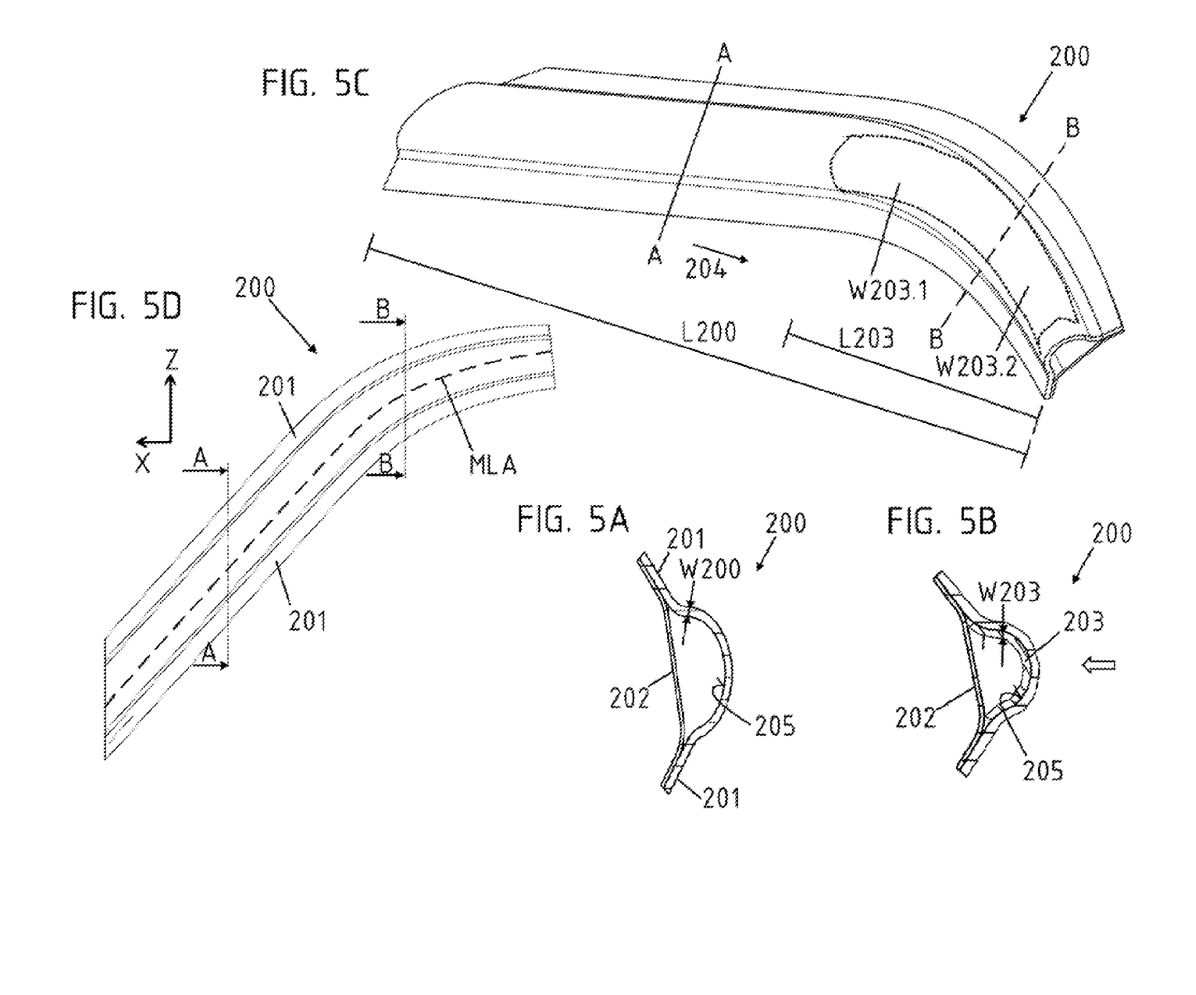

FIGS. 5a to d show a roof spar 200 according to the invention. This roof spar 200 has a C-shaped profile in cross section, with laterally protruding flanges 201. A closing plate 202 is arranged on the rear side, such that a hollow profile is formed. The roof spar 200 can also be formed as an A pillar. A reinforcement patch 203 is arranged on the inner side in a front region. Here, the reinforcement patch 203 has two differing wall thicknesses W203.1, W203.2. The wall thickness W203.1 can in this case be embodied to be greater or smaller than the wall thickness W203. The reinforcement patch 203 extends in the longitudinal direction 204 of the roof spar with a length L203, which corresponds to between 20% and 60%, in particular between 30% and 50%, of the length L200 of the roof spar 200 in the longitudinal direction. The length here is measured along a central longitudinal axis MLA which is shown in FIG. 5d and follows the curvature of the roof spar 200. The length L203 of the reinforcement patch 203 is also determined accordingly. The reinforcement patch 203 rests over its entire surface area against an inner side of the roof spar 200.

REFERENCE SIGNS

1—Motor vehicle pillar
2—Main structural part
3—Reinforcement patch
4—Reinforcement patch
5—Web
6—Leg
7—Flange
8—Longitudinal direction of 1, 2
9—Radii region
10—Inner side of 1
11—Cavity
12—Central region of 5
13—End of 3
14—Outer side of 1
15—Roof connection region
16—Sill connection region
17—Pillar region
18—Outer side of 3, 4
19—Inner side of 3, 4
100—Crossmember
101—Crash box
102—Ribbing
103—Reinforcement patch
104—Wall thickness step
105—Outer side of 103
106—Inner side of 103
107—Inner side of 100
108—Longitudinal direction of 100
109—Longitudinal direction of 103
110—Central region of 100
111—End region of 100
200—Roof spar
201—Flange
202—Closing plate
203—Reinforcement patch
204—Longitudinal direction of 200
205—Inner side of 200
H1—Overall height of 1
H3—Height of 3
H4—Height of 4
L200—Length of 200
L203—Length of 203
MLA—Central longitudinal axis
W1—Wall thickness of 1
W3.1—Wall thickness of 3
W3.2—Wall thickness of 3
W3.3—Wall thickness of 3
W4.1—Wall thickness of 4
W4.2—Wall thickness of 4
W4.3—Wall thickness of 4
W5—Wall thickness of 5
W6—Wall thickness of 6
W7—Wall thickness of 7
W9—Wall thickness of 9
W100—Wall thickness of 100
W103.1—Wall thickness of 103
W103.2—Wall thickness of 103
W103.3—Wall thickness of 103
W200—Wall thickness of 200
W203.1—Wall thickness of 203
W203.2—Wall thickness of 203
W203.3—Wall thickness of 203
X—Motor vehicle longitudinal direction
Y—Motor vehicle transverse direction
Z—Motor vehicle vertical direction
α—Angle

The invention claimed is:

1. A motor vehicle hybrid structural part, comprising:
a main structural part,
at least one reinforcement patch,
the main structural part being embodied as a sheet-metal structural part made of a steel alloy or light metal alloy,
the at least one reinforcement patch being made of aluminum alloy and being an extruded structural part with at least two wall thicknesses differing from one another in cross section,
wherein the direction of extrusion of the at least one reinforcement patch is oriented at an angle of 70° to 110° with respect to a longitudinal direction of the main structural part,
wherein the at least one reinforcement patch comprises a varying thickness along the longitudinal direction, and
wherein the aluminum alloy of the reinforcement patch has a yield strength RP0.2 of greater than 250 MPa.

2. The motor vehicle hybrid structural part of claim 1, wherein the direction of extrusion of the reinforcement patch is oriented at an angle of 85° to 95° with respect to the longitudinal direction of the main structural part, the main structural part comprises a homogeneous wall thickness in its cross section.

3. The motor vehicle hybrid structural part of claim 1, wherein the reinforcement patch and the main structural part are coupled to one another by adhesive bonding, thermal joining, clinching or spot welding.

4. The motor vehicle hybrid structural part of claim 1, wherein the reinforcement patch and the main structural part form a hollow profile at least in portions in the longitudinal direction of the main structural part.

5. The motor vehicle hybrid structural part of claim 1, wherein the main structural part and the reinforcement patch are in contact over their entire surface area, the change in wall thickness being formed on that side which is remote from the main structural part.

6. The motor vehicle hybrid structural part of claim 1, wherein the main structural part is coupled to a closing plate.

7. The motor vehicle hybrid structural part of claim 1, wherein the main structural part is a motor vehicle pillar.

8. The motor vehicle hybrid structural part of claim 7, wherein the motor vehicle pillar has two reinforcement patches arranged spaced apart in its longitudinal direction.

9. The motor vehicle hybrid structural part of claim 7, wherein the motor vehicle pillar has a changing c-shaped having a hat-like cross section in the longitudinal direction, and a differing wall thickness is formed in cross section.

10. The motor vehicle hybrid structural part of claim 7, wherein an overall length of the reinforcement patch corresponds to 50% to 75% of the overall length of the main structural part.

11. The motor vehicle hybrid structural part of claim 1, wherein the main structural part is a crossmember, which has a c-shaped having a hat-like form in its cross section.

12. The motor vehicle hybrid structural part of claim 11, wherein the at least one reinforcement patch comprises three reinforcement patches arranged spaced respectively apart.

13. The motor vehicle hybrid structural part of claim 1, wherein the main structural part is a roof spar, which is configured in cross section in a c shape with protruding flanges, a closing plate being arranged on the rear side and the reinforcement patch being arranged in the cavity which is formed in the longitudinal direction.

* * * * *